United States Patent
Inoue

(10) Patent No.: US 8,725,897 B2
(45) Date of Patent: May 13, 2014

(54) COMMUNICATION APPARATUS AND CONTROL METHOD THEREOF

(75) Inventor: Go Inoue, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 700 days.

(21) Appl. No.: 11/947,265

(22) Filed: Nov. 29, 2007

(65) Prior Publication Data

US 2008/0147776 A1     Jun. 19, 2008

(30) Foreign Application Priority Data

Dec. 18, 2006   (JP) .................................. 2006-340575

(51) Int. Cl.
*G06F 15/16*      (2006.01)

(52) U.S. Cl.
USPC ......................................................... 709/245

(58) Field of Classification Search
USPC .................................................. 709/225, 245
See application file for complete search history.

(56) References Cited

U.S. PATENT DOCUMENTS

| | | |
|---|---|---|
| 2002/0110123 A1 | 8/2002 | Shitama |
| 2005/0204062 A1 | 9/2005 | Sekine |
| 2006/0253852 A1 * | 11/2006 | Honda et al. .................. 717/177 |

FOREIGN PATENT DOCUMENTS

| | | |
|---|---|---|
| JP | 2000-216788 | 8/2000 |
| JP | 2002-152279 | 5/2002 |
| JP | 2003-60659 | 2/2003 |
| JP | 2006-67293 | 3/2006 |
| KR | 2006-0042235 | 12/2006 |
| WO | 2005/036831 | 4/2005 |

OTHER PUBLICATIONS

Paxson, V., "Bro: a system for detecting network intruders in real-time", Computer Networks, Elsevier Science Publishers B.V., Amsterdam, NL, vol. 31, No. 23-24., Dec. 14, 1999.
The Snort Project: "Snort Users Manual 2.6.0", Internet Citation Online Jun. 20, 2006, URL:http://www/mirrors.wiretapped.net/security/network-intrusion-detection/snort/> [retrieved on Nov. 14, 2007].
European Search Report dated Apr. 17, 2008 issued during prosecution of related European application No. 07123523.8.
Korean Office Action dated Nov. 9, 2009 issued during prosecution of related Korean application No. 10-2007-0133599.
E.W. Stevens, "DNS: The Domain Name System", 1994, pp. 187-208. (cited on Jul. 15, 2010 during prosecution of European Application No. EP 07123523.8).
Japanese Office Action dated Aug. 3, 2012 issued during prosecution of related Japanese application No. 2011-162450.
Japanese Office Action dated May 27, 2011 issued during prosecution of related Japanese application No. 2006-340575.
Japanese Office Action dated Feb. 14, 2014 issued during prosecution of related Japanese application No. 2011-162450.

* cited by examiner

Primary Examiner — Shripal Khajuria
(74) Attorney, Agent, or Firm — Fitzpatrick, Cella, Harper & Scinto

(57) ABSTRACT

Address information of an external device is registered as address information to refuse reception or to permit reception in a filtering address storage unit, and additional address information held by an external device having the registered address information is obtained. Then, the obtained additional address information is registered in association with the address information in the filtering address storage unit. In a case that information is received from an external device, it is determined whether or not the address information of the external device is stored in the storage unit so that information from the external device is refused.

12 Claims, 18 Drawing Sheets

| | IPv4 ADDRESS | IPv6 ADDRESS | | MAC ADDRESS | HOST NAME |
|---|---|---|---|---|---|
| NETWORK DEVICE | 169.10.0.1 | fe80::1000 | 3000::1000 | 00aa00123456 | net |
| EXTERNAL DEVICE 302 | 169.10.0.2 | fe80::2000 | 3000::2000 | 00aa00123457 | dev1 |
| EXTERNAL DEVICE 303 | 169.10.0.3 | fe80::3000 | 3000::3000 | 00aa00123458 | dev2 |
| EXTERNAL DEVICE 305 | 169.20.0.1 | fe80::2001 | 3000::2001 | 00aa00123459 | dev3 |
| DNS SERVER 307 | 169.10.0.5 | fe80::5000 | 3000::5000 | 00aa00123460 | |

FIG. 4

|  | IPv4 ADDRESS | IPv6 ADDRESS | | MAC ADDRESS | HOST NAME |
|---|---|---|---|---|---|
| NETWORK DEVICE | 169.10.0.1 | fe80::1000 | 3000::1000 | 00aa00123456 | net |
| EXTERNAL DEVICE 302 | 169.10.0.2 | fe80::2000 | 3000::2000 | 00aa00123457 | dev1 |
| EXTERNAL DEVICE 303 | 169.10.0.3 | fe80::3000 | 3000::3000 | 00aa00123458 | dev2 |
| EXTERNAL DEVICE 305 | 169.20.0.1 | fe80::2001 | 3000::2001 | 00aa00123459 | dev3 |
| DNS SERVER 307 | 169.10.0.5 | fe80::5000 | 3000::5000 | 00aa00123460 | |

FIG. 5

| | | | | |
|---|---|---|---|---|
| net | IN | A | 169.10.0.1 | |
| net | IN | AAAA | fe80::1000 | |
| net | IN | AAAA | 3000::1000 | |
| dev1 | IN | A | 169.10.0.2 | ~ 501 |
| dev1 | IN | AAAA | fe80::2000 | ~ 502 |
| dev1 | IN | AAAA | 3000::2000 | ~ 503 |
| dev2 | IN | A | 169.10.0.3 | |
| dev2 | IN | AAAA | fe80::3000 | |
| dev2 | IN | AAAA | 3000::3000 | |
| dev3 | IN | A | 169.20.0.1 | |
| dev3 | IN | AAAA | fe80::2001 | |
| dev3 | IN | AAAA | 3000::2001 | |

FIG. 10

| IP ADDRESS TO PERMIT CONNECTION |
|---|
| IP ADDRESS TO REFUSE CONNECTION<br>169.10.0.2<br>fe80::2000<br>3000::2000 |

FIG. 12

| MAC ADDRESS TO PERMIT CONNECTION |
|---|
| MAC ADDRESS TO REFUSE CONNECTION<br>00aa00123457 |

F I G. 15

| Internet Address | Physical Address | Type |
|---|---|---|
| 169.10.0.2 | 00aa00123457 | dynamic |
| 169.10.0.3 | 00aa00123458 | dynamic |
| fe80::2000 | 00aa00123457 | dynamic |
| 3000::2000 | 00aa00123457 | dynamic |

F I G. 17
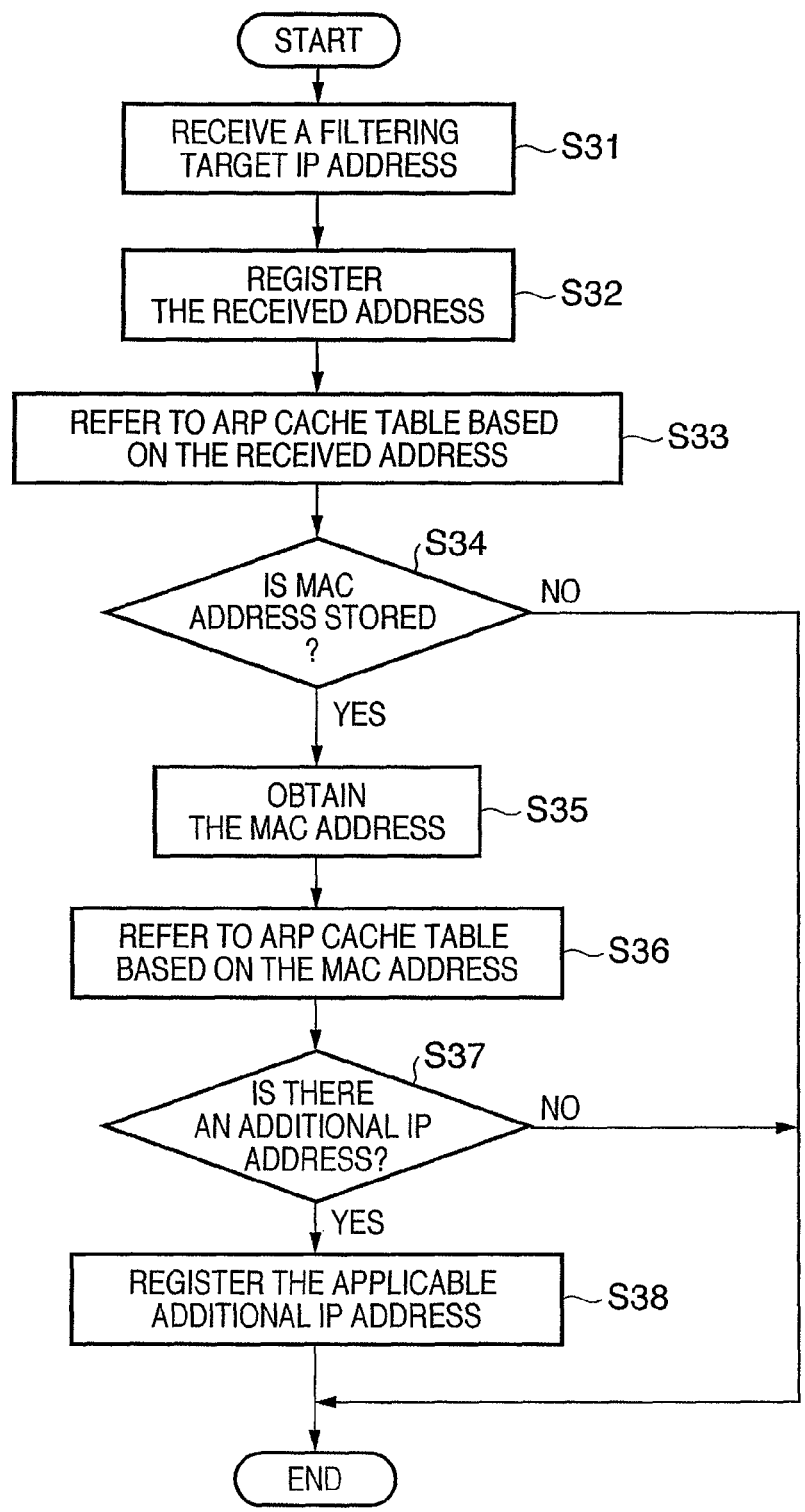

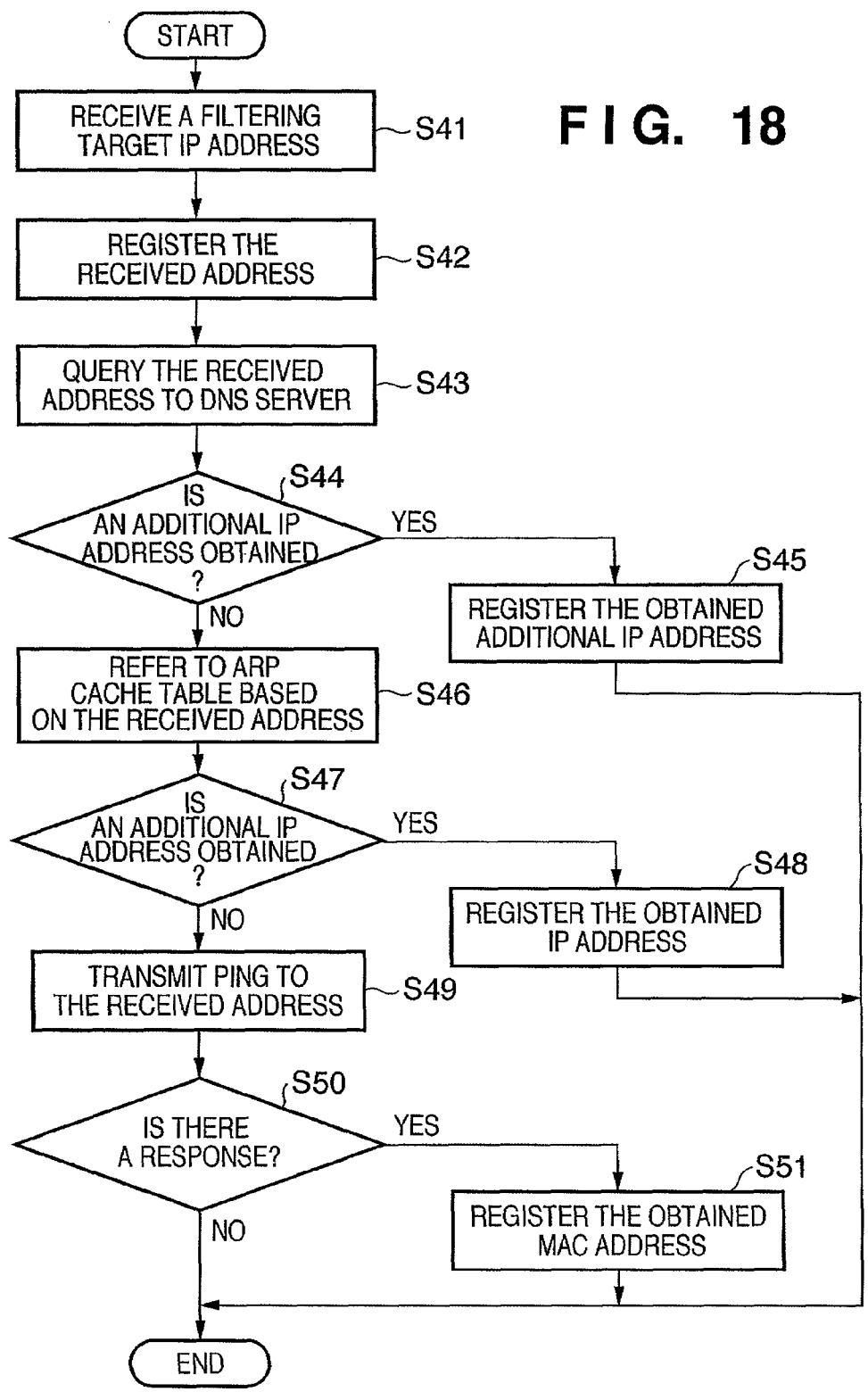

COMMUNICATION APPARATUS AND CONTROL METHOD THEREOF

BACKGROUND OF THE INVENTION

1. Field of the Invention

The present invention relates to a communication apparatus that is connected to a network and that is provided with an address filtering function, and a control method thereof.

2. Description of the Related Art

With the spread of the Internet in recent years, there has been concern over the vulnerability of network security to unwanted remote access or attacks from external devices, packet interception, and so on. As a measure against this, network devices are generally provided with functionality for filtering unwanted access from an external device using an IP address or a physical address. With this kind of filtering function, a user registers a specific address s/he wishes to refuse in advance; security is guaranteed by refusing access from an external device that has the registered address (Japanese Patent Laid-Open No. 2002-152279).

In some of such filtering functions, IP addresses from which reception is to be refused are registered so that the IP address of the external device that issued an access request is identified and filtered when it matches an address that has been registered. In other such filtering functions, MAC addresses are registered so that the MAC address of the external device that issued an access request is identified and filtered when it matches an address that has been registered.

However, conventional network device filtering technologies such as these have increased the workload since in a case where an external device has a plurality of addresses, a user is required to set all the addresses of the external devices as targets to be filtered. Also, there has been a problem in that in a case that a plurality of addresses are registered manually, a registration omission or a registration error may occur, causing a certain external device not to be treated as a target to be filtered, and resulting in a situation in which an unauthorized access cannot be prevented.

On the other hand, in a case that addresses of external devices for which access is to be permitted are registered, if there is a registration omission or a registration error, access from the external devices for which access is supposed to be permitted will be refused. Above all, since conventional filtering technologies have been established assuming only the use of IPv4 addresses, the application of these technologies is difficult in a case where the address length is long and a plurality of addresses is handled, as is the case with IPv6 addresses, the use of which is expected to spread.

SUMMARY OF THE INVENTION

It is desirable to address the above-described problems of the conventional technology.

Another aspect of the present invention is to, in a case that an address of an external device for which reception is to be refused or permitted is registered, reliably refuse or permit reception from the external device by preventing a registration omission or a registration error of the address of the external device.

Yet another aspect of the present invention is to reduce labor required to register the address of the external device.

According to a first aspect of the present invention, there is provided a communication apparatus for transmitting and receiving information to and from an external device through a communication line, the apparatus comprising:

a register processing unit configured to register, in a storage unit, address information of an external device as first address information usable to refuse reception or to permit reception from the external device;

an obtaining unit configured to obtain additional address information held by the external device having the first address information registered by the register processing unit;

an additional register processing unit configured to register, in the storage unit, the additional address information obtained by the obtaining unit in association with the first address information;

a determination unit configured, upon receipt by the communication apparatus of information transmitted thereto by an external device, to determine whether or not the first and/or additional address information of the external device concerned is stored in the storage unit; and a filtering controller configured to refuse or permit reception of such transmitted information from the external device in dependence upon whether or not the determination unit determines that the first and/or additional address information of the external device is stored.

According to a second aspect of the present invention, there is provided a control method of a communication apparatus for transmitting and receiving information to and from an external device through a communication line, the method comprising the steps of:

registering, in a storage unit, address information of an external device as first address information usable to refuse reception or to permit reception from the external device;

obtaining additional address information held by the external device having the first address information registered in the storage unit;

storing, in the storage unit, the obtained additional address information in association with the first address information of the external device;

determining, upon receipt by the communication apparatus of information transmitted thereto by an external device, whether or not the first and/or additional address information of the external device concerned is stored in the storage unit; and filtering to refuse or permit reception of such transmitted information from the external device in dependence upon whether or not it is determined in the determining step that the first and/or additional address information of the external device is stored, refusing or permitting reception of information from the external device.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram illustrating an example of a list of IP addresses and host names of network devices.

FIG. 5 is a diagram illustrating a configuration file that associates IP addresses of the digital multi function peripheral and external devices managed by a DNS server with host names thereof according to an embodiment of the present invention.

FIG. 10 is a diagram illustrating an example of connection admission and connection refusal IP addresses that are stored in a filtering address storage unit according to an embodiment of the present invention.

FIG. 12 is a diagram illustrating a list of filtering target MAC addresses that is stored in a filtering address storage unit according to the second embodiment.

FIG. 15 is a diagram illustrating an example of data stored in a transmission/reception log storage section of the digital multi function peripheral according to the third embodiment.

FIG. 17 is a flowchart explaining a process of the digital multi function peripheral according to a fourth embodiment of the present invention in a case that a user interface section sets an address of a single external device as a filtering target.

FIG. 18 is a flowchart explaining a process of the digital multi function peripheral according to a fifth embodiment of the present invention in a case that a user interface section sets an address of a single external device as a filtering target.

DESCRIPTION OF THE EMBODIMENTS

Numerous embodiments of the present invention will now herein be described below in detail with reference to the accompanying drawings. The following embodiments are not intended to limit the claims of the present invention, and not all combinations of features described in the embodiments are essential to the solving means of the present invention.

Figure 1:
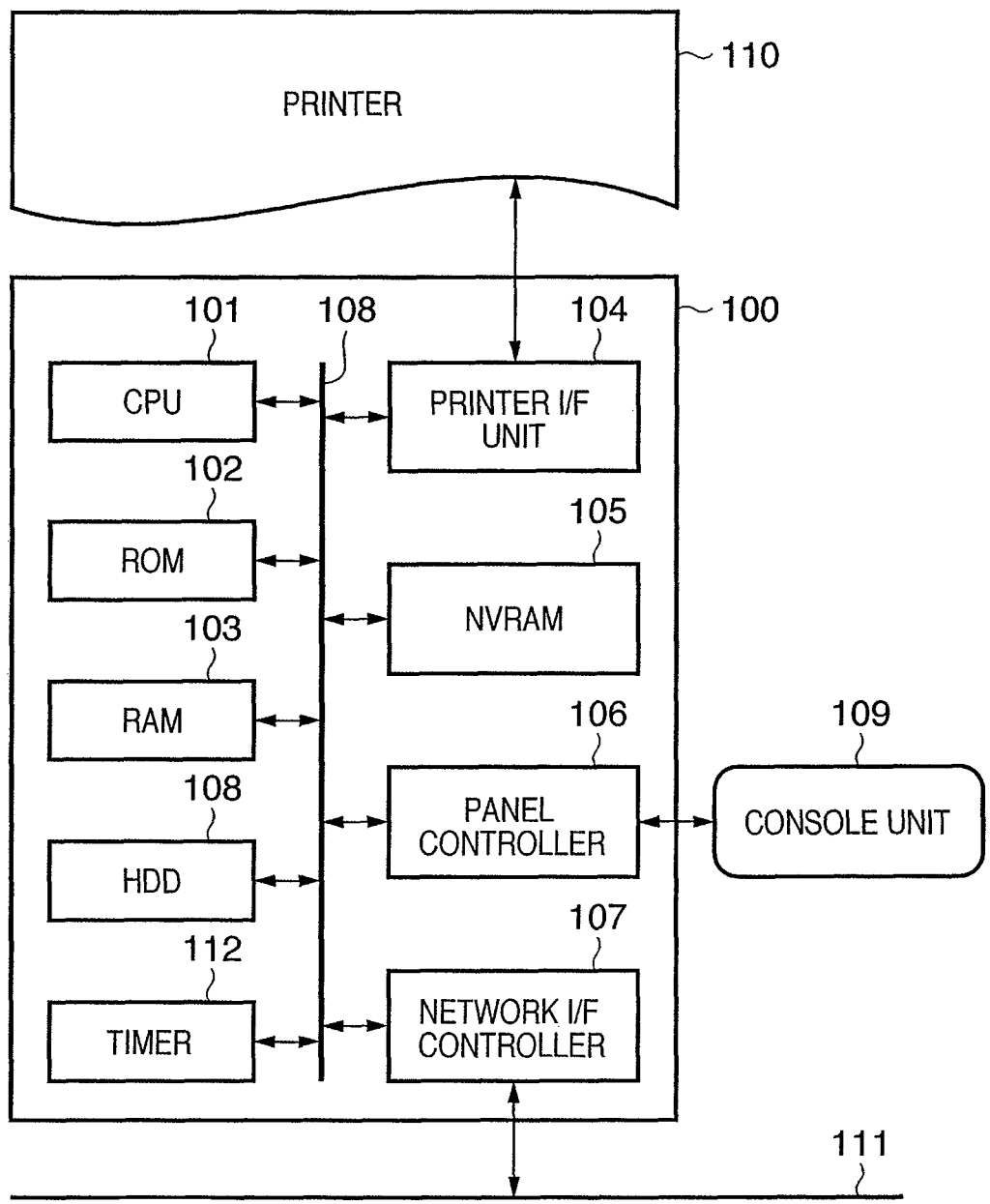
FIG. 1 is a block diagram illustrating a hardware configuration of a digital multi function peripheral according to an exemplary embodiment of the present invention.

FIG. 1 is a block diagram illustrating a hardware configuration of a digital multi function peripheral 100 according to an exemplary embodiment of the present invention. This digital multi function peripheral 100 is connected to a network 111 and functions as a network device (communication apparatus) that can exchange data with another network device through the network 111.

A CPU 101 executes a control program of the digital multi function peripheral 100 so as to control the entire multi function peripheral. A ROM 102 stores a boot program, fixed parameters, and so on of the multi function peripheral 100. A RAM 103 has an area for storing a program that the CPU 101 executes, and is used to temporarily store data and so on when operation of the multi function peripheral 100 is controlled. An HDD 108 is a hard disk drive, and is used to store various data, such as print data. A timer 112 manages elapsed time in a timed process. A printer I/F unit 104 controls operation of a printer 110. An NVRAM 105 is a non-volatile memory, and stores various setting values of the multi function peripheral 100 in a non-volatile manner. A panel controller 106 controls a console unit 109 so that a display on the console unit 109 and various information and instructions that a user enters with the console unit 109 are controlled. A network I/F controller 107 controls transmission and reception of data to and from the network 111, which is a LAN or the like. A bus 108 is a system bus that connects each of the above-mentioned components with the CPU 101 and transfers control signals from the CPU 101, data signals, and the like.

Various application programs to be executed by the CPU 101 are installed on the HDD 108, and when execution of such a program is instructed, the program is loaded to the RAM 103 and executed under the control of the CPU 101.

Figure 2:
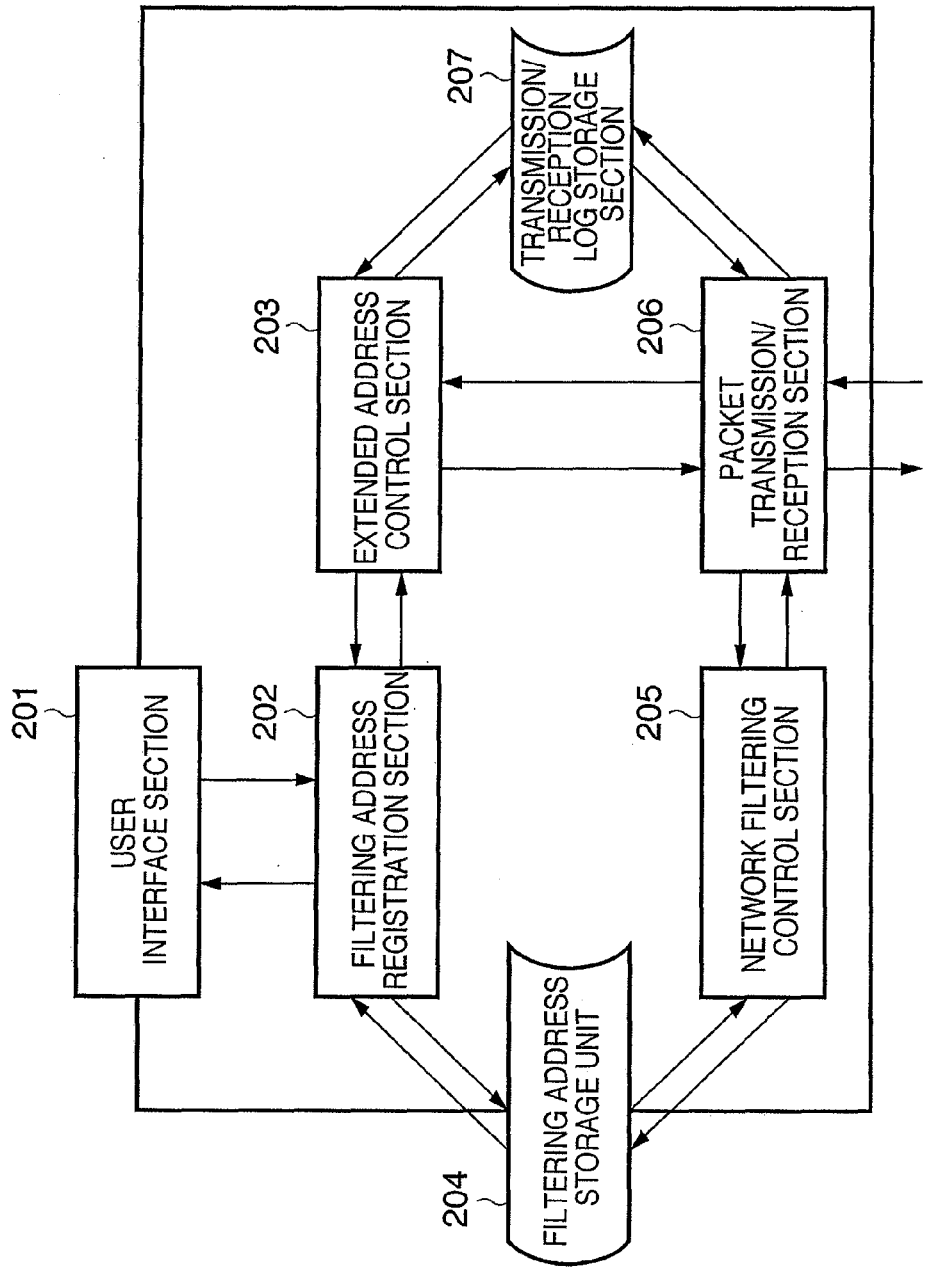
FIG. 2 is a functional block diagram illustrating an example of a software configuration that is executed on a multi function peripheral according to an embodiment of the present invention.

FIG. 2 is a functional block diagram illustrating an example of a software configuration that is executed on the multi function peripheral 100 according to the present embodiment.

In FIG. 2, a user can register an address using a user interface section 201 so that the address is filtered. The user interface section 201 includes a program that controls the console unit 109. Address information entered with the user interface section 201 is stored (registered) in a filtering address storage unit 204 by a filtering address registration section 202 (register processing means (step)). The filtering address storage unit 204 corresponds to the above-mentioned HDD 108 and NVRAM 105. Also, when address information has been registered, the filtering address registration section 202 passes the registered address information to an extended address control section 203 in order to determine whether an external device that holds the registered address information has additional address information. When receiving address information from the filtering address registration section 202, the extended address control section 203 functions as an obtaining means for obtaining additional address information of the external device that holds the received address information by using a transmission/reception log storage section 207 and a packet transmission/reception section 206. The packet transmission/reception section 206 controls exchange of data to and from an external device through the network 111. Thus, additional registration processing means is implemented through the cooperative operation of the extended address control section 203 and the filtering address registration section 202.

The transmission/reception log storage section 207 updates its log information every time packet data is communicated between the packet transmission/reception section 206 and an external device. This log information is stored in association with an IP address or a MAC address of an external device. Note that the transmission/reception log storage section 207 may also be referred to as an ARP (Address Resolution Protocol) cache table. When transmitting packet data to an external device, the packet transmission/reception section 206 first refers to the transmission/reception log storage section 207, and, if there is an applicable IP address, transmits the packet data to the corresponding MAC address. Also, if address information is registered in the filtering address storage unit 204, the address information of the external device that transmitted the connection request is handed to a network filtering control section 205 whenever the packet transmission/reception section 206 receives packet data from the network 111. Here, the network filtering control section 205 refers to the filtering address storage unit 204, and determines if filtering information (address) applicable to the received address information is present. At this point, if applicable filtering information (address) is found in the received address information, the network filtering control section 205 executes a predetermined process with regard to the external device that transmitted the connection request.

Figure 3:
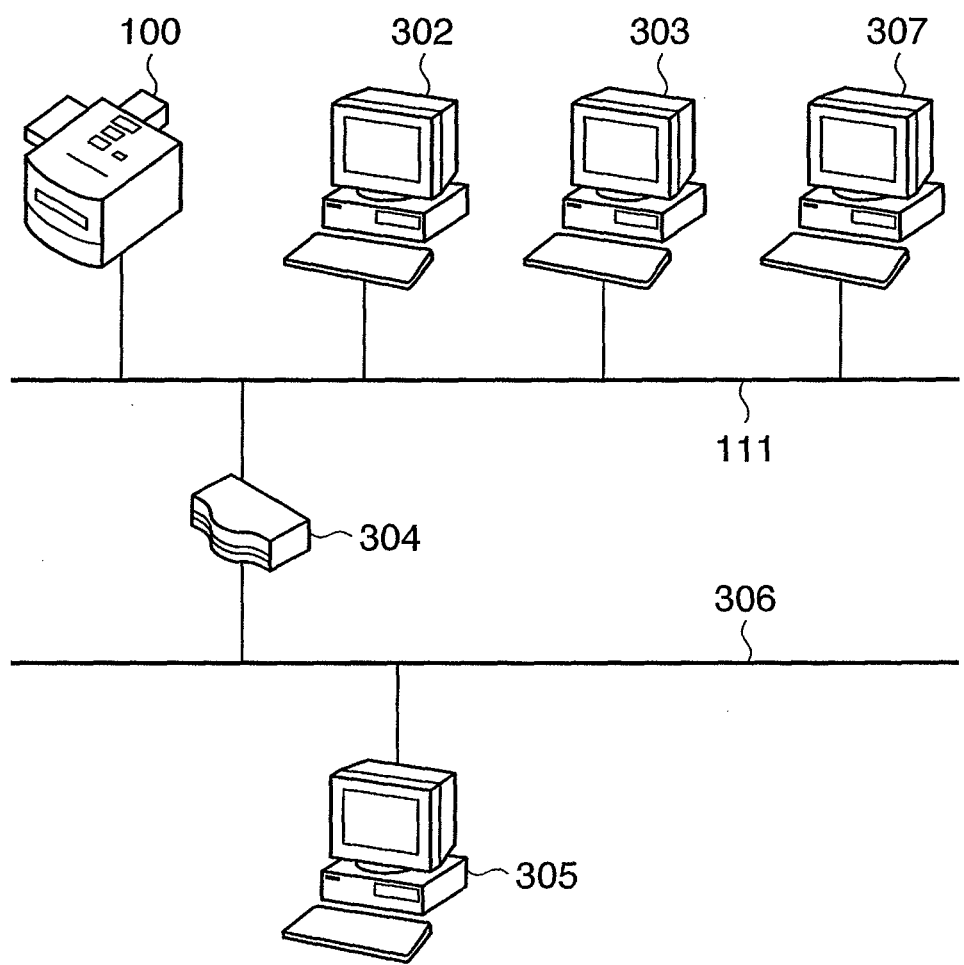
FIG. 3 is a diagram illustrating an example of a network configuration according to an embodiment of the present invention.

FIG. 3 is a diagram illustrating an example of a network configuration according to an embodiment of the present invention.

In FIG. 3, reference numeral 100 denotes the above-mentioned digital multi function peripheral (network device), which is provided with a filtering function according to the present embodiment, and can apply a filtering setting with regard to an external device. Reference numerals 302 and 303 denote external devices that are installed on the network 111, which is shared with the digital multi function peripheral 100, and that communicate data through the network 111. Also, an external device 305 can communicate with the multi function peripheral 100 from a different subnet 306 through a router 304. A DNS server 307 carries out management by associating IP addresses and host names of respective devices (apparatus) on the network 111.

FIG. 4 is a diagram of an example of a list of IP address and host name of network devices.

Here, the digital multi function peripheral (network device) 100 holds an IPv4 address "169.10.0.1" and IPv6 addresses "fe80::1000" and "3000::1000". It also holds a host name "net". Similarly, the external device 302 holds an IPv4 address "169.10.0.2" and IPv6 addresses "fe80::2000" and "3000::2000". It also holds a host name "dev1". The external device 303 holds an IPv4 address "169.10.0.3" and IPv6 addresses "fe80::3000" and "3000::3000". It also holds a host name "dev2". The external device 305 holds an IPv4 address "169.20.0.1" and IPv6 addresses "fe80::2001" and "3000::2001". It also holds a host name "dev3". Finally, the DNS server 307 holds an IPv4 address "169.10.0.5" and IPv6 addresses "fe80::5000" and "3000::5000," and performs name resolution of the IP addresses and host names of the digital multi function peripheral 100, external devices 302 and 303, and 305.

FIG. 5 is a diagram illustrating a configuration file that associates IP addresses of the digital multi function peripheral and external devices managed by a DNS server 307 with host names thereof according to the present embodiment.

Every time a client transmits a DNS Query, the DNS server 307 refers to this configuration file, and responds by performing name resolution. In the DNS server 307, the IP addresses and host names of devices may be set manually by an administrator of the DNS server 307; alternatively, when the DNS setting is enabled in the devices, the devices periodically perform registration on the DNS server 307. In FIG. 5, "IN A" represents an IPv4 address and "IN AAAA" represents an IPv6 address.

Exemplary embodiments of the present invention shall be described hereinafter based on the above-mentioned conditions.

First Embodiment

Figure 6:
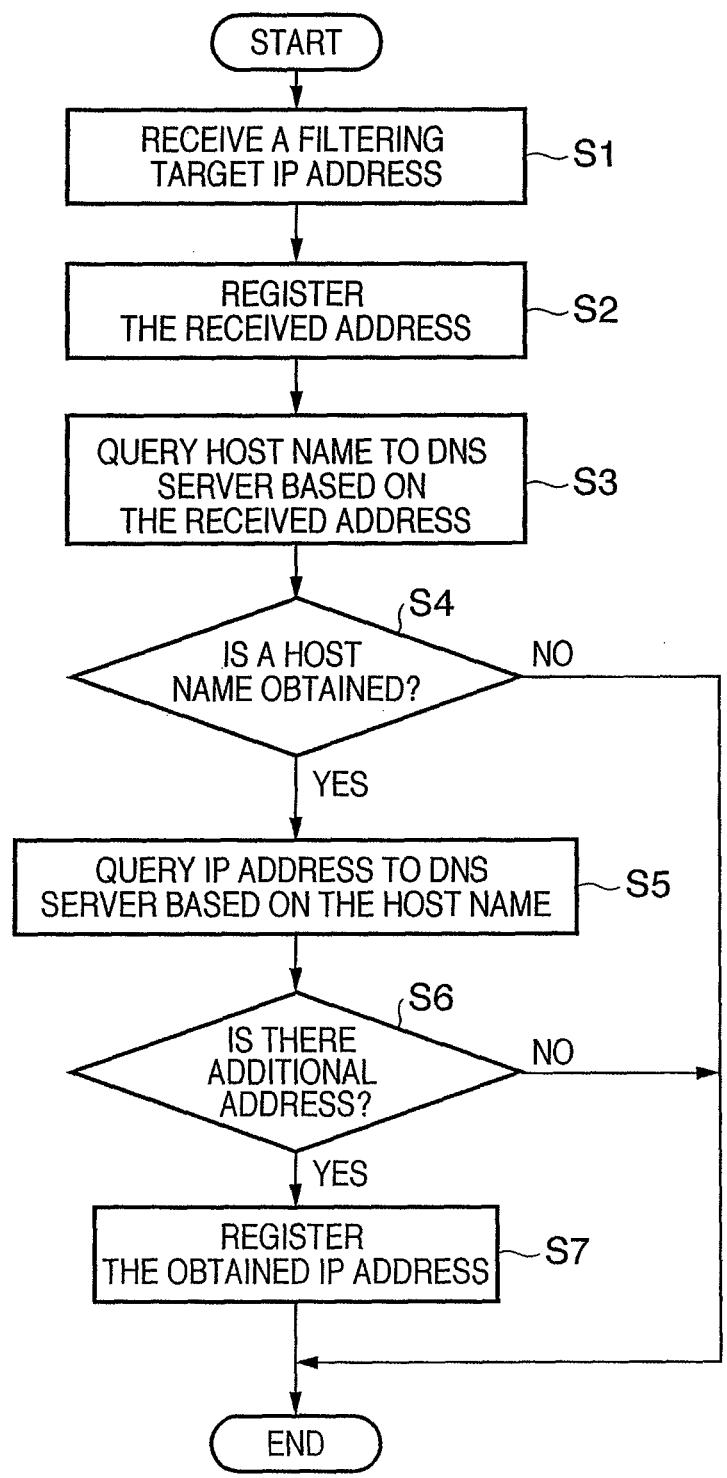
FIG. 6 is a flowchart explaining a process of the digital multi function peripheral according to an embodiment of the present invention in a case that a user interface section sets an address of a single external device as a filtering target.

FIG. 6 is a flowchart explaining a process of the digital multi function peripheral 100 according to a first embodiment in a case that the user interface section 201 sets address information of a single external device as a filtering target. The sequence described here is when an additional IP address related to the address information is obtained as well by using the DNS server 307 and the obtained IP address is also set as a filter target.

First, in step S1, the filtering address registration section 202 receives an IP address to be filtered from the user interface section 201. At this time, in the user interface section 201, any IP address, whether it is an IPv4 address or an IPv6 address, can be entered. In the present embodiment, as shown in FIG. 7, an IPv4 address "169.10.0.2" of the external device 302 is registered as a filtering target address so that connection from the external device 302 is refused.

Figure 7:
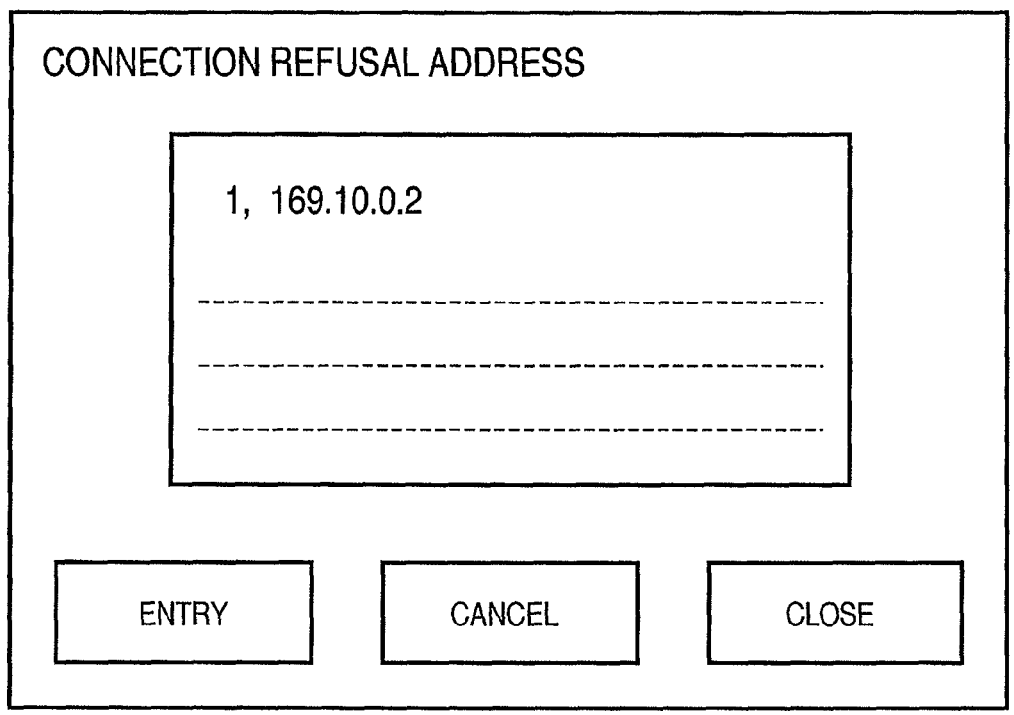
FIG. 7 depicts a view illustrating an example of a screen for registration of a connection refusal address according to an embodiment of the present invention.

FIG. 7 depicts a view illustrating an example of a screen for registration of a connection refusal address in the first embodiment. Here, this address, as well as soft keys to specify "entry," "cancel," and "close", are displayed in a display area of the console unit 109.

Next, in step S2, the filtering address registration section 202 registers the entered address in the filtering address storage unit 204. At this time, if the address matches an IP address that has already been registered in the filtering address storage unit 204, a registration task will not be performed. Furthermore, the filtering address registration section 202 passes the IP address entered in step S1 to the extended address control section 203 in order to obtain an additional IP address held by the external device 302. The extended address control section 203 obtains the additional IP address held by the external device 302 based on predetermined means for obtaining an additional IP address. In the first embodiment, for example, a configuration is adopted such that an additional IP address held by the external device 302 is determined using the DNS server 307 based on the received IP address held by the external device 302.

Next, in step S3, the extended address control section 203 makes an inquiry regarding the host name of the received IP address "169.10.0.2" to the DNS server 307 with a record A (IPv4 address). In step S4, it is determined whether or not the host name was successfully obtained from the DNS server 307. If the host name was successfully obtained, step S5 is carried out, but otherwise the process is terminated. In the first embodiment, the DNS server 307 returns a corresponding host name "dev1" based, for example, on a configuration file shown in FIG. 5.

For example, in FIG. 5, numeral 501 denotes an association between a host name and an IPv4 address of the external device 302, numeral 502 denotes an association between a host name and an IPv6 address of the external device 302, and numeral 503 denotes an association between a host name and an IPv6 address of the external device 302.

When a host name is obtained in step S4, the process advances to step S5 so that the IP address of the obtained host name "dev1" of the external device 302 is queried to the DNS server 307. At this time, a query is made to the DNS server 307 with both the record AAAA and the record A. Then, in step S6, if an IP address is transmitted from the DNS server 307, the process proceeds to step S7, whereas if an applicable IP address is not obtained from the DNS server, this extended address processing is terminated. In the first embodiment, the DNS server 307 returns an IPv4 address "169.10.0.2" corresponding to the record A based, for example, on the configuration file shown in FIG. 5. Also, IPv6 addresses "fe80::2000" and "3000::2000" corresponding to the record AAAA are returned (see FIGS. 4 and 5).

In this manner, the address information obtained from the DNS server 307 is passed to the extended address control section 203 through the packet transmission/reception section 206. The extended address control section 203 determines whether or not any addresses other than the IP address "169.10.0.2" registered in the filtering address storage unit 204 are present in the list. According to the above-mentioned list, the IP addresses "fe80::2000" and "3000::2000" have not yet been registered. In this case, the process advances from step S6 to step S7 so that the extended address control section 203 passes these two IP addresses to the filtering address registration section 202. Through this, the filtering address registration section 202 registers the IP addresses in the filtering address storage unit 204.

Figure 8:
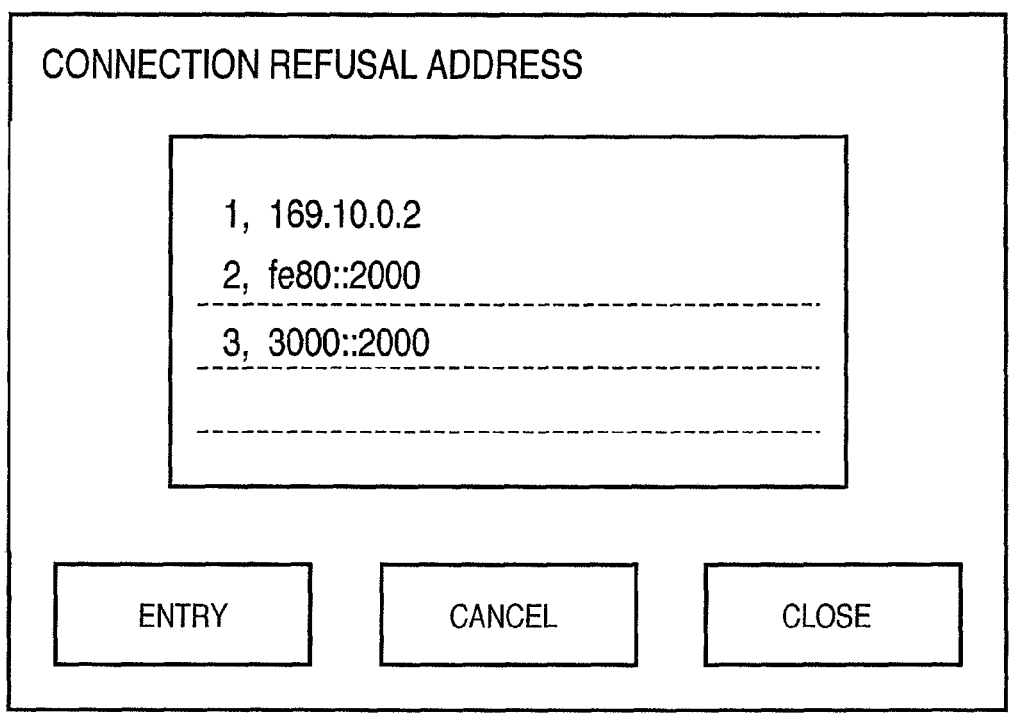
FIG. 8 depicts a view illustrating an example of a registration screen for registering all IP addresses held by an external device as connection refusal addresses, according to an embodiment of the present invention.

Herewith, all IP addresses held by the external device 302 are displayed in the user interface section 201 as shown in FIG. 8, and if "close" is specified at this time, these addresses are registered as filtering addresses. If it is preferred to not register them as filtering addresses at this point, the addresses can be excluded from filtering address by selecting an applicable address and specifying "cancel."

FIG. 8 depicts a view illustrating an example of a registration screen for registering as connection refusal addresses all IP addresses held by the external device 302 according to the present embodiment. This screen is displayed in the console unit 109.

Figure 9:
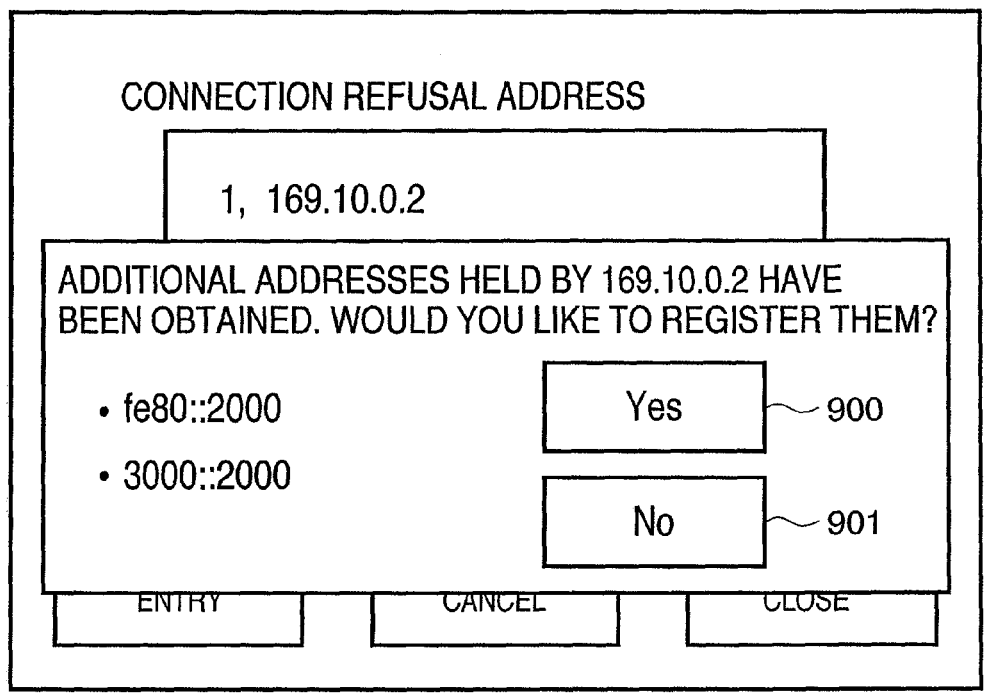
FIG. 9 depicts a view illustrating an example of a screen in which a user is asked to select whether or not to register additional IP addresses held by an external device as connection refusal addresses according to an embodiment of the present invention.

Alternatively, a list of additional IP address held by the external device 302 may be displayed as shown in FIG. 9 so that a user can select whether or not to register each address.

FIG. 9 depicts a view illustrating an example of a screen in which a user is asked to select whether or not to register the respective additional IP addresses held by the external device 302 as connection refusal addresses according to the present embodiment. When one of the two displayed addresses is selected with a cursor (not shown), if "Yes" 900 is specified, the address is registered as a connection refusal address, whereas if "No" 901 is specified, the address is not registered as a connection refusal address. In this manner, a user can select whether or not to register the respective addresses as filtering target addresses on an address-by-address basis.

Hereinafter, a process that takes place when the external device 302 transmits a packet in an attempt to connect to the multi function peripheral 100 using the IP address "169.10.0.2" after the digital multi function peripheral 100 has thus completed the registration task shall be described. In this case, the multi function peripheral 100 obtains the destination IP address "169.10.0.2" from the packet received by the packet transmission/reception section 206. Then, the address information is passed to the network filtering control section 205. The network filtering control section 205 refers to the filtering address storage unit 204 to determine whether or not the received IP address has been set as a filtering target.

FIG. 10 is a diagram illustrating an example of connection admission and connection refusal IP addresses that are stored in the filtering address storage unit 204 according to the present embodiment.

In this example, the address "169.10.0.2" received from the external device 302 has been registered as a connection refusal address. Thus, the network filtering control section 205 discards the received packet, and instructs the packet transmission/reception section 206 to refrain from returning a response to the packet that requests a connection.

Furthermore, in a case that the external device 302 transmits a connection request packet to the digital multi function peripheral 100 using the IP address "fe80::2000", the connection request is discarded in the procedure similar to that taken for the IP address "169.10.0.2".

Finally, in a case that the external device 303 transmits a connection request packet to the multi function peripheral 100 using the IP address "169.20.0.3", since the IP address is not registered in the filtering address storage unit 204, the connection request is accepted and communication is established.

As explained thus far, in the first embodiment, when a user simply registers one of the IP addresses held by the external device 302, an additional IP address held by the external device 302 can be obtained and registered as a filtering address. This makes it possible to reliably refuse reception of packet data from an external device that has a plurality of IP addresses, thereby reducing security risks caused by an address registration omission.

Furthermore, this has an effect such that the workload required for registration is reduced since a simple instruction for registration of reception refusal on a single IP address of a certain external device can automatically register additional address information of the external device.

Note that although an IPv4 address is registered in the first embodiment, an IPv6 address may be registered instead. Also, when an IPv6 address is entered, in step S3 of the flowchart of FIG. 6, a DNS Query for a host name may be transmitted to the DNS server 307 with the record AAAA.

Embodiment 2

Figure 11:
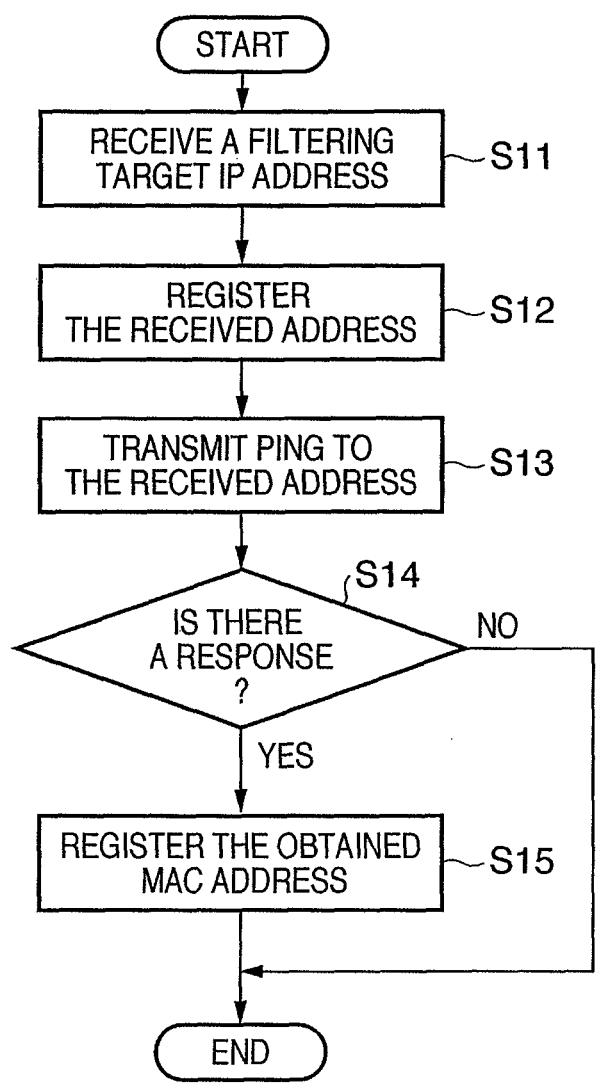
FIG. 11 is a flowchart explaining a process of the digital multi function peripheral according to a second embodiment of the present invention in a case that a user interface section sets an address of a single external device as a filtering target.

FIG. 11 is a flowchart explaining a process of the digital multi function peripheral 100 according to a second embodiment of the present invention in a case that the user interface section 201 sets an address of a single external device as a filtering target. In this example, a MAC address of the external device is obtained by transmitting a ping command to a registered IP address, and the obtained MAC address is applied to a MAC address filter so that filtering is performed on a physical layer level. Note that since the multi function peripheral 100, its software configuration, its network configuration, and so on in the second embodiment are the same as in the first embodiment, explanations thereof shall be omitted. The ping command is a command that transmits small-sized packet data to a destination over a TCP/IP network such as the Internet to check the state of a communication line based on a return time of a response to the packet data.

First, in step S11, the filtering address registration section 202 receives an IP address to be filtered from the user interface section 201. At this time, in the user interface section 201, an IP address may be entered with either an IPv4 address or an IPv6 address. In the second embodiment, an IPv4 address "169.10.0.2" of the external device 302 is entered to register as a filtering target address as shown in FIG. 7, similarly to as in the above-described first embodiment.

Next, in step S12, the filtering address registration section 202 registers the entered address in the filtering address storage unit 204. At this time, if the IP address has already been registered, the registration task is not performed. Then, in step S13, the digital multi function peripheral 100 transmits a ping command to the registered IP address in order to obtain a MAC address of the external device 302. Then, if a response to the ping command is received from the external device 302 in step S14, the process advances to step S15. If there is no response, the process is terminated as is.

In step S15, a MAC address "00aa00123457" that is included in a packet received from the external device is obtained (see FIG. 4). Then, the MAC address is passed to the network filtering control section 205. With this, the network filtering control section 205 registers the MAC address in the filtering address storage unit 204 as a MAC address of a connection refusal address.

This will cause the following process to take place when, subsequently, the external device 302 attempts to access to the multi function peripheral 100 with an IP address, for example, of "169.10.0.2". In other words, the packet transmission/reception section 206 obtains a destination MAC address from a received packet to determine the filtering conditions of the MAC address that is located at a lower layer of the packet. Then, the MAC address is passed to the network filtering control section 205. With this, the network filtering control section 205 refers to the filtering address storage unit 204 to determine whether the MAC address it was passed has been set as a filter target. The filtering address storage unit 204 stores a list of filtering target MAC addresses, as shown in FIG. 12. Thus, in this case, since the MAC address of the IP address "169.10.0.2" is "00aa00123457" according to FIG. 4 and matches a connection refusal MAC address shown in FIG. 12, an access request from the external device 302 is refused.

FIG. 12 is a diagram illustrating a list of filtering target MAC addresses that has been stored in the filtering address storage unit 204 according to the second embodiment.

As described above, a filtering target MAC address is registered in the filtering address storage unit 204 as a connection refusal address. Upon determining that the applicable address is stored, the network filtering control section 205 sends connection refusal to the packet transmission/reception section 206. This causes the packet transmission/reception section 206 to promptly discard the received packet, since the received packet is a packet from an address that is registered so that a connection is refused therefrom.

Similarly, even when the external device 302 accesses the multi function peripheral 100 using an IP address "fe80::2000", the MAC address is still the same, and thus the connection request is refused in a similar manner as that above.

Meanwhile, in a case that the external device 303 with a different IP address attempts to access this multi function peripheral 100, unless the address of the external device 303 is registered in the filtering address storage unit 204, transmission and reception of a packet to and from the external device 303 is carried out.

Although in the second embodiment, an IPv4 address is registered from the user interface section 201, the address can also be an IPv6 address. If an IPv6 address is set as a filtering address, it is determined whether the entered address is an IPv4 address or an IPv6 address. If it is an IPv4 address, a corresponding ping command is issued in step S13. If it is an IPv6 address, a ping command that corresponds to the address can be issued.

Also, in the second embodiment, there are cases where an address of an external device that is registered in the filtering address storage unit 204 is outside of the same link, such as the external device 305 shown in FIG. 3. In this case, the digital multi function peripheral 100 transmits a ping command to the external device 305. In such a case, a destination MAC address of the response packet returned from the external device 305 is a MAC address of the router 304. Accordingly, if a MAC address is registered as a filtering address as described in the above-mentioned embodiment, it will be configured to refuse access from all the external devices that traverse the router 304. Given this factor, a function may be added to determine whether or not the MAC address is an address of the router 304 in a case that the multi function peripheral 100 receives a response to a ping command. For example, when a MAC address is obtained, the MAC address is compared with the MAC address of the default gateway address (router) that has been configured in advance in the multi function peripheral 100 so as to determine whether or not the address is the router's address. Alternatively, a routing table held by the multi function peripheral 100 may be referred to so as to determine whether or not it is the address of the router 304. If the external device that is the origin of the transmission is determined to be outside of the router 304, an option may be given to a user to select whether or not to register the MAC address of the router 304 as a filtering address, as shown in FIG. 13.

Figure 13:
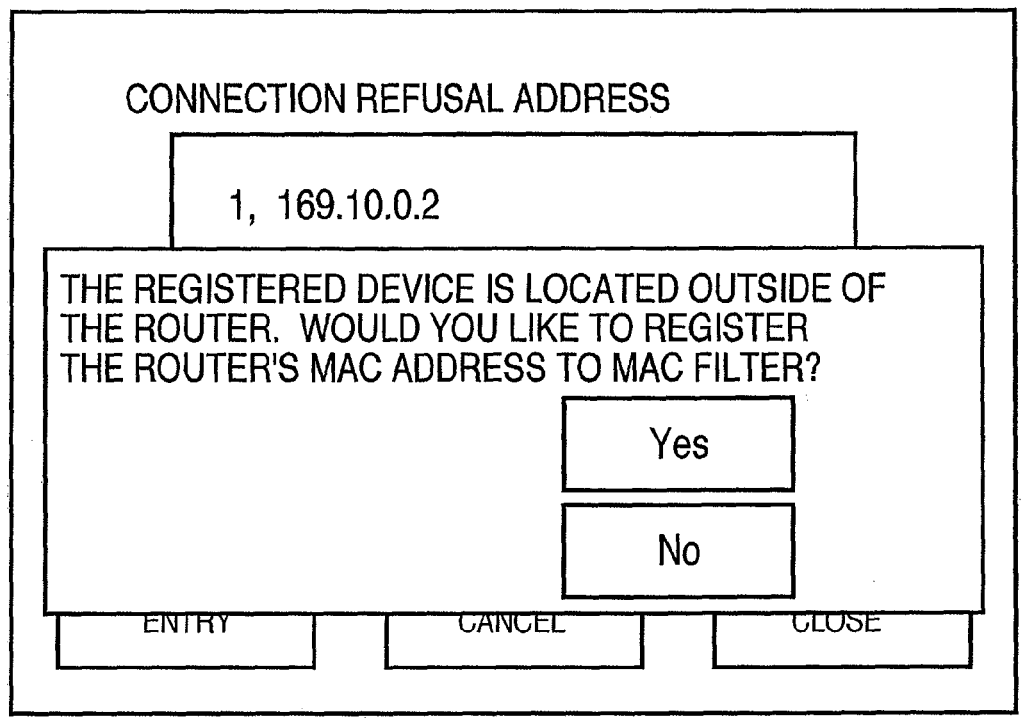
FIG. 13 depicts a view illustrating an example of a screen in the second embodiment in which a user is asked to select whether or not to register a MAC address as a filtering address in a filtering address storage unit when the MAC address has been determined to be a MAC address of a router.

FIG. 13 depicts a view illustrating an example of a screen in the second embodiment in which a user is asked to select whether or not to register a MAC address as a filtering address in the filtering address storage unit 204 in a case that the address is determined to be the MAC address of the router 304.

If "Yes" is specified at this point, the MAC address of the router will be registered in the filtering address storage unit 204, whereas if "No" is specified, the registration will be cancelled.

In another example, when an IP address is entered in the user interface section 201, a tracer command is used to determine if the communication to the IP address traverses the router 304. If the external device that holds the IP address is determined to be outside of the router 304, an option may be given in a similar manner by displaying a screen as shown in FIG. 13 so that the user can select whether or not to register the MAC address of the router 304 in the filtering address storage unit 204.

As described above, according to the second embodiment, a MAC address that corresponds to the registered IP address can be obtained and the MAC address can be registered as a filtering address without using a DNS server.

Also, in a case that a MAC address is received through a router, the MAC address can be registered by having a user select whether or not to register the MAC address as a filtering address.

Embodiment 3

Figure 14:
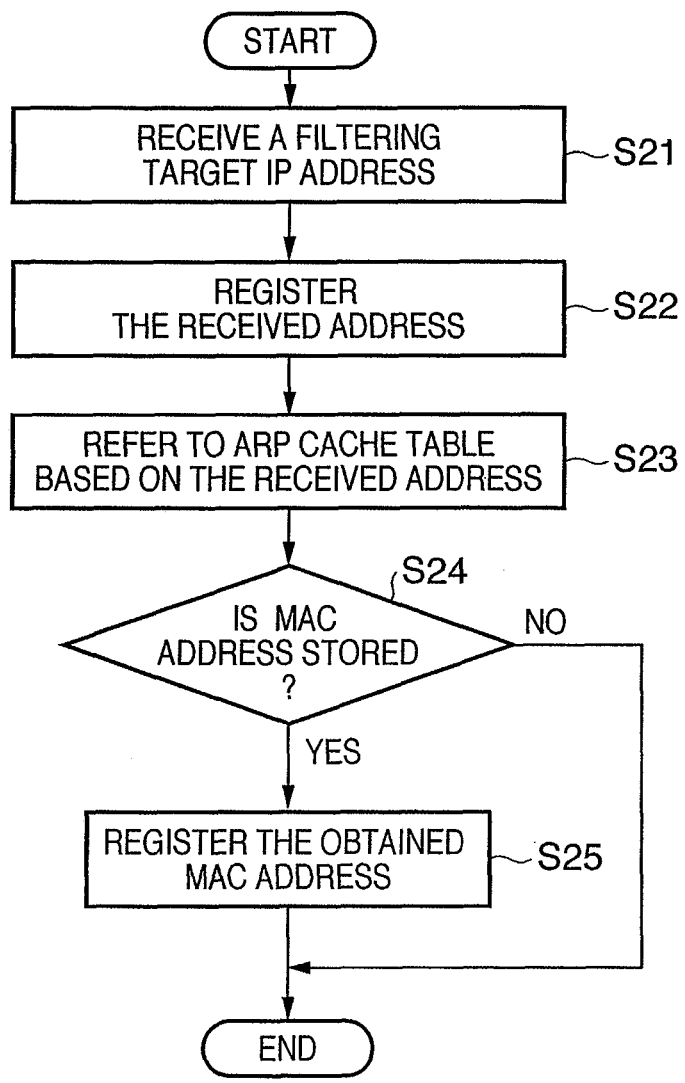
FIG. 14 is a flowchart explaining a process of the digital multi function peripheral according to a third embodiment of the present invention in a case that a user interface section sets an address of an external device as a filtering target.

FIG. 14 is a flowchart explaining a process of the digital multi function peripheral 100 according to a third embodiment of the present invention in a case that a user sets an address of an external device as a filtering target using the user interface section 201. It should be noted that since the multi function peripheral 10, its software configuration, its network configuration, and so on in the third embodiment are the same as that of the first embodiment, explanations thereof will not be given.

The process shown in FIG. 14 represents a process in which filtering is performed on a physical layer level by obtaining a MAC address of an external device with the use of the transmission/reception log storage section 207 and by storing the obtained MAC address in the filtering address storage unit 204.

First, in step S21, the filtering address registration section 202 enters the IP address to be filtered from the user interface section 201. At this time, in the user interface section 201, an IP address may be entered with either an IPv4 address or an IPv6 address. In the third embodiment, for example, as shown in FIG. 7 in the above-described first embodiment, an IPv4 address "169.10.0.2" of the external device 302 is registered as a connection refusal address.

Next, in step S22, the filtering address registration section 202 registers the entered address in the filtering address storage unit 204. At this time, if the IP address matches an IP address that has already been registered in the filtering address registration section 202, the address is not registered.

Then, in step S23, in order to obtain a MAC address of the external device 302, the digital multi function peripheral 100 refers to the transmission/reception log storage section 207 that is held by the multi function peripheral 100 and determines the MAC address of the external device 302. In the transmission/reception log storage section 207, as shown in FIG. 15, for example, destination IP addresses and MAC addresses from the past communications between the multi function peripheral 100 and external devices are stored in pairs.

FIG. 15 is a diagram illustrating an example of stored data of the transmission/reception log storage section 207 of the multi function peripheral 100 according to the third embodiment.

FIG. 15 shows that the IP address "169.10.0.2" holds the MAC address ("Physical Address" in FIG. 15) "00aa00123457".

Subsequently, if a MAC address is stored in the transmission/reception log storage section 207 in step S24, then the process advances to step S25 so that the extended address control section 203 passes the obtained MAC address to the filtering address registration section 202. Through this, the filtering address control section 202 refers to the filtering address storage unit 204 to determine whether or not the applicable MAC address has already been registered in the filtering address registration section 202. If it has not yet been registered, "00aa00123457" is newly registered as a filtering target MAC address in step S25.

Figure 16:
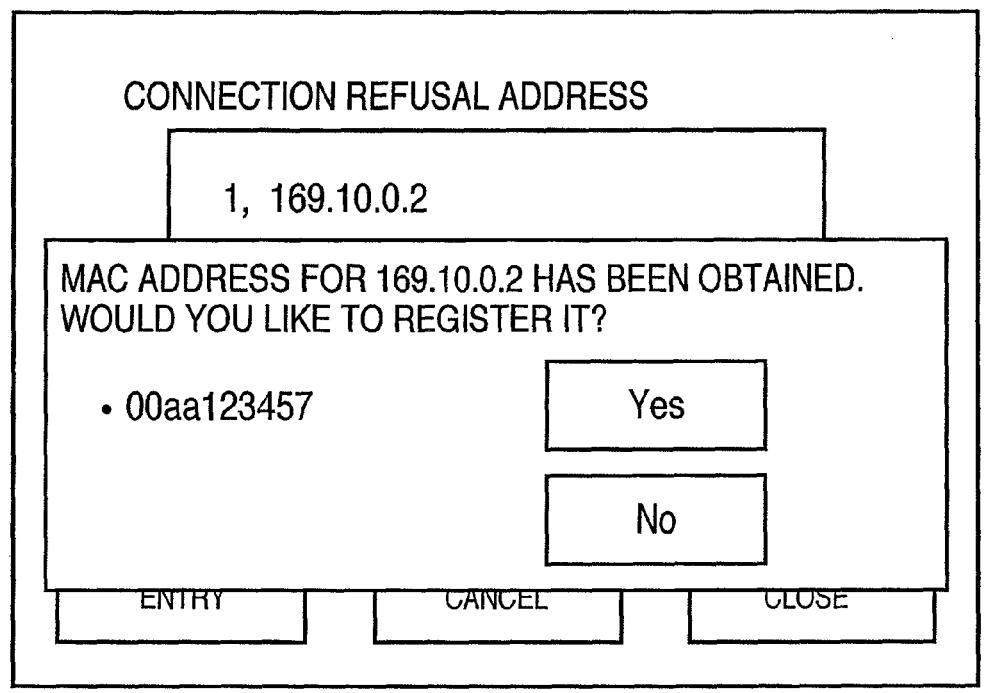
FIG. 16 is a diagram illustrating an example of a screen in which a user is asked to select whether or not to register an obtained MAC address as a filtering address.

Alternatively, as shown in FIG. 16, an option may be displayed in the console unit 109 so that a user can select whether or not to register the obtained MAC address as a MAC address to be filtered.

FIG. 16 depicts a view illustrating an example of a screen in the console unit 109 in which a user is asked to select whether or not to register the MAC address obtained in this manner as a filtering address.

If "Yes" is specified on the screen, the MAC address is registered as a filtering address, whereas if "No" is specified, the MAC address is not registered.

Note that if the IP address is not stored in the transmission/reception log storage section 207 in step S24, the extended address processing is terminated as is.

Through this, even when the external device 302 attempts access with the IP address "169.10.0.2", the packet transmission/reception section 206 first checks the filtering conditions of the MAC address that is located at a lower layer. Then, the MAC address is obtained from the received packet and passed to the network filtering control section 205. With this, the network filtering control section 205 refers to the filtering address storage unit 204 to determine whether the MAC address it was passed has been set as a filter target.

Here, in the filtering address storage unit 204, a list of filtering target MAC addresses is stored as shown in the above-described FIG. 12. In this case, since the MAC address "00aa00123457" is registered as a connection refusal address, the network filtering control section 205 sends connection refusal to the packet transmission/reception section 206. As a result, the packet transmission/reception section 206 promptly discards the received packet since the received packet is determined to have been registered as a packet from which to refuse connection.

Likewise, if the external device 302 attempts access with the IP address "fe80::2000", since its MAC address is "00aa00123457" (see FIG. 4), the connection request from the external device 302 will be refused in a similar manner.

Meanwhile, in a case that an external device 303 having an address that is not a refused address attempts to access to the multi function peripheral 100, the connection request from the external device 303 is accepted since the address of the external device 303 has not been registered in the filtering address storage unit 204.

As explained thus far, in the third embodiment, a MAC address that corresponds to the IP address can be obtained from a packet transmission/reception log so that the MAC address is also registered as a filtering address. With this, not only an IP address but also a MAC address can be registered as a filtering address so that connection requests from filtered external devices can be more reliably refused.

Embodiment 4

FIG. 17 is a flowchart explaining a process of the digital multi function peripheral 100 according to a fourth embodiment of the present invention in a case that the user interface section 201 sets an address of a single external device as a filtering target. The fourth embodiment is an example in which the transmission/reception log storage section 207 is used to obtain an additional IP address held by a certain external device so that the obtained IP address is set as a target of IP filtering. It should be noted that since the digital multi function peripheral 100, its software configuration, its network configuration, and so on in the fourth embodiment are the same as those of the first embodiment, explanations thereof shall be omitted.

First, in step S31, the filtering address registration section 202 receives a filtering target IP address from the user interface section 201. At this time, in the user interface section 201, an IP address may be entered with either an IPv4 address or an IPv6 address. In the fourth embodiment, for example, an IPv4 address "169.10.0.2" of the external device 302 is registered as a filtering target address, as shown in the above-mentioned FIG. 7.

Next, in step S32, the filtering address registration section 202 registers the entered address in the filtering address storage unit 204. If the address matches an IP address that has already been registered in the filtering address storage unit 204, the IP address will not be registered, as mentioned above. Then, in step S33, the multi function peripheral 100 refers to the transmission/reception log storage section 207 in order to obtain a MAC address of the external device 302 that corresponds to the IP address. Next, in step S34, it is determined whether or not the MAC address that corresponds to the IP address received in step S31 has been stored.

In the example shown in FIG. 15, the content of the transmission/reception log storage section 207 shows that the IP address "169.10.0.2" holds the MAC address "00aa00123457".

If, in step S34, it is determined that the applicable MAC address has been stored, the process proceeds to step S35 so that the MAC address is obtained. If, in step 34, it is determined that the MAC address that corresponds to the IP address has not been stored, the extended address processing is terminated.

Subsequently, the process advances from step S35 to step S36, the extended address control section 203 checks the transmission/reception log storage section 207 in order to determine whether or not an additional IP address that corresponds to the obtained MAC address is present. Then, if it is determined in step S37 that an additional IP address that corresponds to the MAC address obtained in step S35 is present, the process proceeds to step S38.

In the example shown in FIG. 15, it is clear that the MAC address "00aa00123457" holds IP addresses "fe80::2000" and "3000::2000" in addition to "169.10.0.2". Thus, in this case, these IP addresses are passed to the filtering address storage unit 204. In this example, the process proceeds from step S37 to step S38 so that the filtering address registration section 202 registers the received IP addresses in the filtering address storage unit 204.

If the IP address is not found in the transmission/reception log storage section 207 in step S37, the extended address processing is terminated as is. Even if the IP address is present and a MAC address is obtained, in a case that there are no logs that involve an additional IP address in the packet transmission/reception section 206, the extended address processing is terminated.

Subsequently, if the external device 302 attempts access with the IP address "169.10.0.2", the packet transmission/reception section 206 first checks the filtering conditions of a MAC address that is located at a lower layer. Thus, the MAC address is obtained from the received packet and the MAC address is passed to the network filtering control section 205. With this, the network filtering control section 205 refers to the filtering address storage unit 204 to determine whether the MAC address it was passed has been set as a filtering target. Here, in the filtering address storage unit 204, there is a list of filtering target MAC addresses, as shown in, for example, FIG. 12, with which it can be confirmed that the MAC address is registered as a connection refusal address. Thus, the network filtering control section 205 sends connection refusal to the packet transmission/reception section 206. The packet transmission/reception section 206 discards the received packet as the received packet has been registered so that a connection is refused therefrom.

Likewise, if the external device 302 attempts access with the IP address "fe80::2000", since its MAC address has been registered as a filtering target, the connection request is discarded in a manner similar to that described above.

Also, in a case that the external device 303 with a different address attempts to access the multi function peripheral 100, if the address of the external device 303 is not registered in the filtering address storage unit 204, connection will be established with the external device 303.

As explained thus far, in the fourth embodiment, an additional IP address being held by a certain device as well as the MAC address can be automatically obtained from a filtering target IP address and registered as filtering addresses. This has an effect in that even if a filtering target external device has a plurality of addresses, all such addresses can be obtained and registered as filtering target addresses.

Fifth Embodiment

In the first through fourth embodiments, an additional address held by an external device is also obtained and a filtering setting is made internally. However, there are environments in which these respective operations are not possible.

For example, in the case of the first embodiment, an additional address cannot be obtained in an environment in which a DNS server does not exist. Also, in a setting in which the external device does not register its own address in the DNS server 307, a query to the DNS server 307 by the digital multi function peripheral 100 results in a name resolution failure.

In addition, in the case of the above-described second embodiment, if the external device to which a ping command is transmitted is turned off, naturally a response cannot be obtained. Also, if an external device exists outside of the router 304 as has been previously described, the MAC address obtained will be the MAC address of the router 304.

Furthermore, in the cases of the third and fourth embodiments, if there are no logs of communication between the multi function peripheral 100 and an external device, no information on the external device exists in its transmission/reception log storage section 207.

Since environments to which the above-described embodiments cannot be applied can be assumed, a case in which embodiments are carried out in combination with one another will be considered.

FIG. 18 is a flowchart explaining a process of the digital multi function peripheral 100 according to a fifth embodiment of the present invention when a user interface section sets an address of a single external device as a filtering target. The fifth embodiment describes an extended IP address processing sequence in which the above-mentioned embodiments are combined.

First, in step S41, the filtering address registration section 202 enters an IP address to be filtered from the user interface section 201. At this time, in the user interface section 201, an IP address may be entered with either an IPv4 address or an IPv6 address. In the fifth embodiment, for example, the IPv4 address "169.10.0.2" of the external device 302 is registered as a filtering target address, as shown in the above-mentioned FIG. 7.

Next, in step S42, the filtering address registration section 202 registers the entered address in the filtering address storage unit 204. At this time, if the IP address matches an IP address that has already been registered in the filtering address storage unit 204, it will not be registered. In a subsequent step S43, a host name is queried to the DNS server 307 based on the entered IP address. This process is the same as in the above-described first embodiment. A detailed explanation of the process is given in relation to the first embodiment above.

In step S44, it is determined whether or not an IP address different from the entered IP address is obtained by the query to the DNS server 307. If a different IP address is obtained, the process advances to step S45 so that the IP address is also set as a filtering target, and the extended address processing is terminated. Also, as in the above-described first embodiment, an option may be displayed so that a user can select whether or not to register the obtained IP address as a filtering target.

Meanwhile, if an address resolution cannot be achieved as a result of the query to the DNS server 307 in step S44, the process advances to step S46 so that the transmission/reception log storage section 207 held by the digital multi function peripheral 100 is referred to in an attempt to obtain an additional IP address. This process is the same as step S33 in the fourth embodiment. A detailed explanation of the process is given in relation to the fourth embodiment above. If the transmission/reception log storage section 207 is referred to in step S46 and it is determined that an additional IP address is obtained in step S47, the process proceeds to step S48 so that the additional IP address is also registered as a filtering target. Alternatively, an option may be displayed so that a user can select whether or not to register the obtained IP address as a filtering target.

Also, in the fifth embodiment, although an IP address is obtained by using the transmission/reception log storage section 207, a means for obtaining a MAC address may be used as per the above-described third embodiment.

If no address is obtained from the DNS server 307 in step S44, it is possible that the external device has not registered its own address in the DNS server 307. Since no registrations in the DNS server 307 often means that there is no need for registration, the external device is likely to be in the same link as the multi function peripheral 100. Thus, it is likely that there is a cache of past communication in the transmission/reception log storage section 207 of the multi function peripheral 100. Therefore, it is likely that an additional IP address can be obtained in step S47.

Meanwhile, if an additional IP address cannot be obtained in step S47 even after referring to the transmission/reception log storage section 207, the process advances to step S49; a ping command is transmitted to the entered IP address in an attempt to obtain a MAC address of the external device. This process is the same as the process (Step S13 in FIG. 11) in the above-described second embodiment. Refer to the second embodiment for a detailed explanation of the process.

Then, in step S50, it is determined whether or not a response to the transmission of the ping command is obtained. If there is a response, the process advances to step S51 so that the obtained MAC address is registered as a filtering target. Alternatively, it may be determined whether or not the obtained MAC address is an address of the router 304, and if it is the address of the router 304, a screen of FIG. 13 may be displayed for selection of whether or not to register the MAC address as a filtering address.

If there is no response to the ping command in step S50, the extended IP address processing is terminated.

As explained thus far, in the fifth embodiment, by combining address acquisition processes from the above-described embodiments, points of concern that could not be handled by the embodiments due to environment issues can be compensated for. Thus a more secure filtering function can be achieved.

As explained thus far, in the fifth embodiment, a user can automatically set an additional IP address by setting only one of the IP addresses held by an external device as a filtering target. This reduces workload involved in setting a plurality of IP addresses.

Furthermore, the fifth embodiment has an effect in that security vulnerabilities caused by an omission or an error of address registration can be prevented. Although in the first through fifth embodiments, examples in which a certain address is registered as a reception refusal address are described, the present invention may also be applied in a case that a certain address is registered as a reception admission address. In other words, reception from any address other than a registered certain address may be refused rather than performing settings to refuse only a registered certain address. At this time, the workload of a user can be reduced if, when a user enters a single address as a reception admission address, additional address information held by the external device that corresponds to the address is obtained and registered as a reception admission address.

Other Embodiments

The present invention may also be implemented by supplying, directly or remotely, a software program that achieves a function of an embodiment described above to a system or a device so that a computer of the system or of the device reads and executes the supplied program. In this case, a form is not limited to a program as long as a function of a program is provided.

Thus, the present invention can also be achieved through a program code itself that is installed on the computer so as to embody functional processing of the present invention in the computer. In other words, the claims of the present invention also include an actual computer program for achieving functional processing of the present invention. In this case, the form of the program, including object code, a program executed by an interpreter, script data supplied to an OS, and so on, is not particularly limited, as long as the program function is provided.

A variety of recording media may be used to supply the program. Examples include floppy (registered trademark) disk, hard disk, optical disk, magneto-optical disk, MO, CD-ROM, CD-R, CD-RW, magnetic tape, non-volatile memory card, ROM, and DVD (DVD-ROM, DVD-R).

Another program supplying method is to supply a program by having a browser of a client computer connect to a web site on the Internet and download the program from the homepage to a recording medium such as hard disk. In this case, what is downloaded may be an actual computer program of the present invention or a compressed file that includes an automatic installation function. Also, the present invention may be achieved by dividing program code that constitutes a program of the present invention into a plurality of files and having the respective files downloaded from different web sites. In other words, a WWW server that enables a plurality of users to download a program file that embodies functional processing of the present invention on a computer is also included in the claims of the present invention.

Furthermore, a form in which a program of the present invention is distributed to a user after being encrypted and stored in a storage medium such as CD-ROM is acceptable. In this case, a user who meets a predetermined condition is permitted to download key information that releases the encryption from a web site, so that the user can install the encrypted program on a computer in a usable form by using the key information.

In addition, a form other than a form in which a function of an embodiment mentioned above is achieved by having a computer executing a program that is read is also feasible. For example, when an OS or the like that runs on a computer performs part or all of an actual process based on an instruction of the program, there is a possibility that the process achieves a function of an embodiment described above.

Furthermore, a program that is read from a storage medium may be set to be written on a function extension board that is inserted into a computer or a memory that is provided with a function extension unit. In this case, a CPU or the like that is provided to the function extension board or the function extension unit performs a part or all of an actual process based on an instruction of the program, and thereby a function of an embodiment described above is achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2006-340575, filed Dec. 18, 2006, which is hereby incorporated by reference herein in its entirety.

What is claimed is:

1. A communication apparatus capable of communicating with an external device through a communication line, the communication apparatus comprising:

a register unit configured to register, in a storage unit, a first IP address of an external device which is refused to communicate with the communication apparatus, wherein the first IP address is an address of a plurality of IP addresses assigned to the external device;

an obtaining unit configured to obtain, when the first IP address is registered by the register unit, a second IP address of the external device indicated by the registered first IP address, wherein the second IP address is an address of the plurality of IP addresses assigned to the external device;

an additional register unit configured to register, in the storage unit, the second IP address obtained by the obtaining unit as an IP address which is refused to communicate with the communication apparatus;

a determination unit configured to, when receiving information from an external device, determine whether or not a sender IP address included in the information is registered in the storage unit; and a filtering controller configured to refuse reception of the information from the external device in a case that the determination unit determines that the sender IP address is registered in the storage unit.

2. A communication apparatus according to claim 1, wherein the additional register unit comprises:

an inquiring unit configured to inquire with a user whether or not to register in the storage unit the second IP address obtained by the obtaining unit, and a unit configured to decide whether or not to register in the storage unit the second IP address based on a response to the user inquiry.

3. A communication apparatus according to claim 1, wherein the obtaining unit obtains the second IP address by querying a DNS server through the communication line.

4. A communication apparatus according to claim 1, further comprising a log storage unit configured to store a log of communication through the communication line, wherein the obtaining unit obtains the second IP address from the log storage unit.

5. A control method of a communication apparatus capable of communicating with an external device through a communication line, the method comprising the steps of:

registering, in a storage unit, a first IP address of an external device which is refused to communicate with the communication apparatus, wherein the first IP address is an address of a plurality of IP addresses assigned to the external device;

obtaining, when the first IP address is registered by the registering step, a second IP address of the external device indicated by the registered first IP address, wherein the second IP address is an address of the plurality of IP addresses assigned to the external device;

an additional registering step of registering, in the storage unit, the obtained second IP address as an IP address which is refused to communicate with the communication apparatus;

determining, when receiving information from an external device, whether or not a sender IP address included in the information is registered in the storage unit; and filtering to refuse reception of the information from the external device in a case that it is determined in the determining step that the sender IP address is registered in the storage unit.

6. A control method according to claim 5, wherein the additional registering step comprises:

a step of inquiring with a user whether or not to register in the storage unit the second IP address obtained in the obtaining step, and a step of deciding whether or not to register the second IP address in the storage unit based on a response to the user inquiry.

7. A control method according to claim 5, wherein in the obtaining step, the second IP address is obtained by querying a DNS server through the communication line.

8. A control method according to claim 5, further comprising:

a log storage step of storing a log of communication through the communication line, wherein in the obtaining step, the second IP address is obtained from the stored log.

9. A non-transitory computer readable storage medium storing a program that, when executed by a computer, performs a control method of a communication apparatus capable of communicating with an external device through a communication line, the method comprising the steps of:

registering, in a storage unit, a first IP address of an external device which is refused to communicate with the communication apparatus, wherein the first IP address is an address of a plurality of IP addresses assigned to the external device;

obtaining, when the first IP address is registered by the registering step, a second IP address of the external device indicated by the registered first IP address, wherein the second IP address is an address of the plurality of IP addresses assigned to the external device;

registering, in the storage unit, the obtained second IP address as an IP address which is either to be refused or permitted to communicate with the communication apparatus;

determining, when receiving information from an external device, whether or not a sender IP address included in the information is registered in the storage unit; and filtering to refuse reception of the information from the external device in a case that it is determined in the determining step that the sender IP address is registered in the storage unit.

10. A communication apparatus capable of communicating with an external device through a communication line, the communication apparatus comprising:

a register unit configured to register, in a storage unit, a first IP address of an external device which is permitted to communicate with the communication apparatus, wherein the first IP address is an address of a plurality of IP addresses assigned to the external device;

an obtaining unit configured to obtain, when the first IP address is registered by the register unit, a second IP address of the external device indicated by the registered first IP address, wherein the second IP address is an address of the plurality of IP addresses assigned to the external device;

an additional register unit configured to register, in the storage unit, the second IP address obtained by the obtaining unit as an IP address which is permitted to communicate with the communication apparatus;

a determination unit configured to, when receiving information from an external device, determine whether or not a sender IP address included in the information is registered in the storage unit; and a controller configured to permit reception of the information from the external device in a case that the determination unit determines that the sender IP address is registered in the storage unit.

11. A control method of a communication apparatus capable of communicating with an external device through a communication line, the method comprising the steps of:

registering, in a storage unit, a first IP address of an external device which is permitted to communicate with the communication apparatus, wherein the first IP address is an address of a plurality of IP addresses assigned to the external device;

obtaining, when the first IP address is registered by the registering step, a second IP address of the external device indicated by the registered first IP address, wherein the second IP address is an address of the plurality of IP addresses assigned to the external device;

an additional registering step of registering, in the storage unit, the obtained second IP address as an IP address which is permitted to communicate with the communication apparatus;

determining, when receiving information from an external device, whether or not a sender IP address included in the information is registered in the storage unit; and permitting reception of the information from the external device in a case that it is determined in the determining step that the sender IP address is registered in the storage unit.

12. A non-transitory computer readable storage medium storing a program that, when executed by a computer, performs a control method of a communication apparatus capable of communicating with an external device through a communication line, the method comprising the steps of:

registering, in a storage unit, a first IP address of an external device which is permitted to communicate with the communication apparatus, wherein the first IP address is an address of a plurality of IP addresses assigned to the external device;

obtaining, in a case that the first IP address is registered in the registering step, a second IP address of the external device indicated by the registered first IP address, wherein the second IP address is an address of the plurality of IP addresses assigned to the external device;

registering, in the storage unit, the obtained second IP address as an IP address which is permitted to communicate with the communication apparatus;

determining, when receiving information from an external device, whether or not a sender IP address included in the information is registered in the storage unit; and permitting reception of the information from the external device in a case that it is determined in the determining step that the sender IP address is registered in the storage unit.

* * * * *